UNITED STATES PATENT OFFICE.

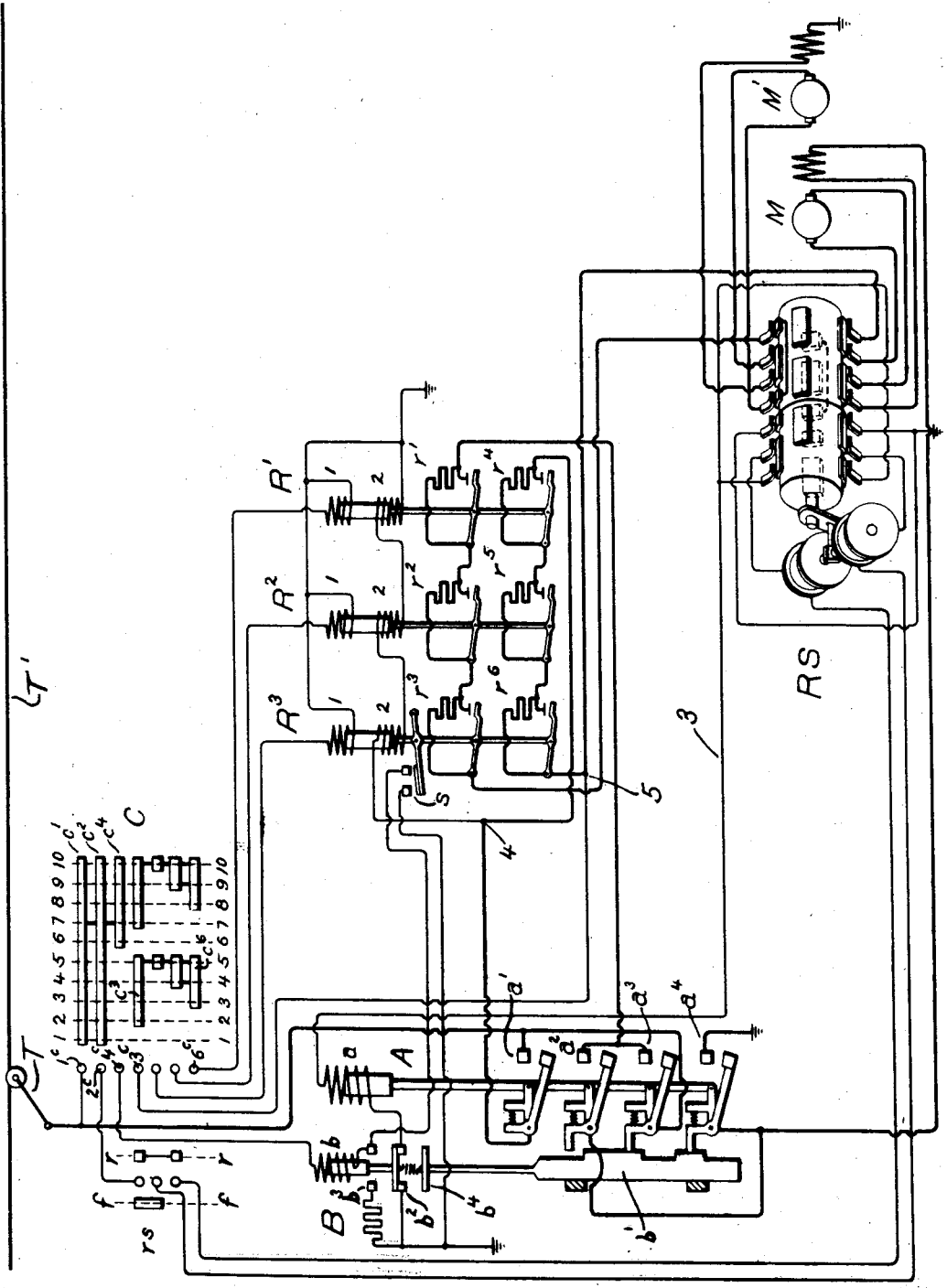

EUGENE R. CARICHOFF, OF EAST ORANGE, NEW JERSEY, ASSIGNOR TO GENERAL ELECTRIC COMPANY, A CORPORATION OF NEW YORK.

SYSTEM OF CONTROL.

No. 867,476.

Specification of Letters Patent.

Patented Oct. 1, 1907.

Application filed January 19, 1906. Serial No. 296,766.

*To all whom it may concern:*

Be it known that I, EUGENE R. CARICHOFF, a citizen of the United States, residing at East Orange, county of Essex, State of New Jersey, have invented certain new and useful Improvements in Systems of Control, for which the following is a specification.

The present invention relates to systems of control for electric translating devices, particularly electric motors, and comprises a novel construction and arrangement of parts to be hereinafter described and particularly pointed out in the claims.

The present invention will be more fully understood and the advantages thereof will appear from the following description taken in connection with the accompanying drawing which illustrates diagrammatically and conventionally a preferred form.

Reference being had to the drawing, M and $M^1$ indicate two motors which are illustrated as ordinary series motors such as are commonly used in electric railway service but which may be of any other usual or preferred type.

T represents a current collecting device engaging with a conductor or trolley wire $T^1$.

R S is a reversing switch adapted to govern the relative connections of the field and armature windings of the motors in order to vary the direction of rotation of the motors.

A is a switch apparatus for connecting the motors to the source of current supply.

$R^1$, $R^2$ and $R^3$ are electromagnetically-actuated switches adapted to control the amount of resistance in the motor circuit.

B is a device coöperating with the switch device A in order that the motors may be connected in series and in parallel at will.

$f$ $r$ $s$ is a master reversing switch. C a master controller. The reversing switch apparatus is of an old and well-known type and the switch mechanism A B is substantially the same as the switch controlled by the solenoids A and F in Patent No. 777,883, granted on December 20, 1904, on an application filed by me.

The parts are so arranged that the switches $R^1$, $R^2$ and $R^3$ may be closed in automatic succession or may be controlled at will from the master controller. The resistance controlling switches are each provided with two coils 1 and 2; the coils 1, as will hereinafter appear, being connected in shunt to the motor armatures and tending to close the switches to cut out sections of resistance, while the coils 2 are connected directly across the line and oppose the actuating coils. This arrangement is advantageous where the line voltage is fluctuating, since without the opposing coils the resistance would be cut out before the motor current had dropped to the desired value in case the line voltage should be above the normal; while the motor current would have to drop below the desired value before resistance would be cut out when the line voltage fell below the normal value. By adding the opposing coils, which are connected directly across the line, an equalizing effect is produced, for when the line voltage rises the actuating coils must overcome a stronger opposing pull than under normal conditions, while when the line voltage falls, the opposing pull is less than the normal opposing pull.

The switch apparatus A comprises a solenoid $a$ tending, when energized, to close the switches $a^1$, $a^2$, $a^3$ and $a^4$.

The device B comprises the solenoid $b$, operating a selective device $b^1$, which, when the solenoid is deënergized, prevents the switches $a^3$ and $a^4$ from closing; and when the solenoid is energized, prevents switch $a^2$ alone from closing, and switches $a^1$, $a^3$ and $a^4$ being then free to close. When the master reversing switch is moved to either the position $ff$ or $rr$, and the master controller is moved to its first running position, the main reversing switch is operated to give the motor connections corresponding to the position of the master reverser and the actuating circuit for the reversing switch is then shifted in the usual manner to wire 3, thence through the actuating solenoid $a$, through interlock $b^2$ of solenoid $b$, to ground. The solenoid $a$, being energized, closes switches $a^1$ and $a^2$, switches $a$ $a^3$ and $a^4$ being restrained by the selective device. The motor circuit may now be traced from trolley through switch $a^1$, resistance sections $r^4$, $r^5$, $r^6$, through one side of the reversing switch and motor M, to switch $a^2$, through resistance sections $r^1$, $r^2$ and $r^3$, through the other side of the reversing switch and motor $M^1$, to ground; a branch circuit also passes from point 4 through the coils 2 of the resistance switch to ground. When the master controller is moved to the third running position, namely, wherein the movable contacts engage with fixed contacts along line 3 3, the motor circuit remains unchanged, but the branch circuit extends from point 5 located between resistance sections $r^4$, $r^5$ and $r^6$, and the motors, through contacts $3^c$, $c^3$, $c^6$, $6^c$, through the actuating coil 1 of the resistance switch $R^1$, to ground. If the motor speed is low, so that but little current flows through the shunt circuit containing the actuating coil of resistance switch $R^1$, this resistance switch is not closed, but remains open until the counter-electro motive force of the motors has reached such a value that coil 1 is able to overcome the opposition of coil 2; and, when this happens, the switch $R^1$ is closed and resistance sections $r^1$ and $r^4$ are cut out. In the same way, in the fourth running position of the controller, the actuating coil for switch $R^2$ is cut in, and, in position 5 the actuating coil of switch $R^3$. In each case, however, the closing of successive resistance switches is dependent upon the existence of a definite relation between the counterelectromotive force of the motors and the electromotive force of the source of supply.

It is noted that if the master controller is initially moved to its fifth running position, namely, that position wherein the fixed contacts engage the movable contacts along line 5 5, the resistance switches are adapted to close in automatic succession, the parts being so arranged that switch $R^2$ cannot close until switch $R^1$ is closed to cut out the corresponding resistance sections, and switch $R^3$ cannot close until switches $R^1$ and $R^2$ have been closed. In the sixth running position of the controller, the circuits of the actuating coils of the resistance switches are interrupted and current passes from trolley through contacts $1^c$, $c^1$, $c^4$ and $4^c$, through the solenoid $b$, through interlocking contact $s$, connected to resistance switch $R^3$, thence to ground. The energizing of solenoid $b$ causes the selective device $b^1$ to be raised and contacts $b^2$ to be opened; therefore the solenoid $a$ is deënergized and the switches $a^1$ to $a^4$ are all opened and consequently all the circuits are interrupted. The solenoid $b$ completes a circuit in itself independent of the switch $s$ through an auxiliary switch $b^3$, to ground. The circuit including solenoid $a$ is again completed by reason of movable contact member $b^4$, controlled by solenoid $b$, which contact member now engages with the fixed contact members of interlock $b^2$. Solenoid $a$, being again energized, places switches $a^1$ $a^4$ under tension and all of these switches, except switch $a^2$ are closed. The motors are now connected in parallel, motor M being in series with resistances $r^4$ to $r^6$, and motor $M^1$ in series with the remaining resistance sections. As the master controller is turned into and through its further running positions the resistance switches are again closed in a manner described, until all this resistance is cut out of circuit, it being possible to control each resistance switch directly from the master controller or to permit them to be closed in automatic succession, depending upon whether the controller is moved step by step or directly to its final running position.

It is evident that although I have shown my improved resistance controlling apparatus as associated with the series parallel controller, it is not limited to use with a controller of this type.

What I claim as new and desire to secure by Letters Patent of the United States, is,—

1. In combination, a source of current supply, a motor or motors connected to said source of supply, a controlling device for said motor or motors, an actuating coil for said device whose current depends upon the counterelectromotive force of said motor or motors, and a coil whose current depends upon the potential of said source of current supply, said latter coil being arranged to oppose the actuating coil.

2. In combination, a source of current supply, a motor or motors connected to said source of supply, a controlling device for said motor or motors, actuating and opposing coils associated with said controlling device, means connecting said opposing coil directly to said source of supply, and means connecting said actuating coil in shunt to the motor armature or armatures.

3. In combination, a source of current supply, a motor or motors connected to said source of supply, a speed controller comprising a plurality of individual switches and actuating coils constructed and arranged to operate said switches in succession as the counterelectromotive force of said motor or motors increases, and opposing coils for said switches connected directly to said source of current supply.

4. In combination, a source of current supply, a motor or motors connected to said source of supply, a resistance in the motor circuit, a series of individual switches connected to said resistance for cutting it out step by step, actuating coils associated with said switches, means for connecting said actuating coils to the source of current supply in series with said resistance and in shunt to said motor or motors, the arrangement being such that the switches are operated successively as the counterelectromotive force of the motor rises, and opposing coils for said switches connected directly to said source of supply.

5. In combination, a source of current supply, a motor or motors connected to said source of current supply, a motor controller comprising a plurality of individual switches, electromagnetic actuating means for said switches controlled by the counterelectromotive force of said motor or motors and arranged to close said switches in automatic progression, a master switch, and connections between said master switch and said actuating means for interrupting the automatic progression of said switches at any point.

In witness whereof, I have hereunto set my hand this seventeenth day of January, 1906.

EUGENE R. CARICHOFF.

Witnesses:
SIDNEY GOLDSTEIN,
WILLIAM J. CUMING.